T. A. JEBB.

Duplex Tickets.

No. 137,081. Patented March 25, 1873.

No. of Ticket 12 — No. of Book 237

| Month | Date | | Amt. | Paid | East / West |
|---|---|---|---|---|---|
| | | | | | Charlotte |
| Jan. | 17 | 1 | $0.01 | $0.01 | Rochester |
| Feb. | 18 | 2 | 0.02 | 0.02 | Spencerport |
| Mar. | 19 | 3 | 0.03 | 0.03 | Adams Basin |
| Apr. | 20 | 4 | 0.04 | 0.04 | Brockport |
| May | 21 | 5 | 0.05 | 0.05 | Holley |
| June | 22 | 6 | 0.10 | 0.10 | Murray |
| July | 23 | 7 | 0.15 | 0.15 | Albion |
| Aug. | 24 | 8 | 0.20 | 0.20 | Knowlesville |
| Sept. | 25 | 9 | 0.25 | 0.25 | Medina |
| Oct. | 26 | 10 | 0.40 | 0.40 | Middleport |
| Nov. | 27 | 11 | 0.50 | 0.50 | Gasport |
| Dec. | 28 | 12 | 0.65 | 0.65 | Lockport |
| | 29 | 13 | 0.75 | 0.75 | Lockp't Jun. |
| | 30 | 14 | 0.85 | 0.85 | Sanborn |
| | 31 | 15 | 1.00 | 1.00 | Susp. Brid. |
| | | 16 | 1.25 | 1.25 | Niag. Falls |
| | | | 1.50 | 1.50 | |
| | | | 1.75 | 1.75 | |

New York Central & Hudson River Rail Road.

Not Good for Passage.

This half of Patent Duplex Ticket is of No Value except to the Conductor, who must return it to the Office of the Company, according to instructions.

Form 8.

Rochester & Niagara Falls.
(N.Y.C. & H.R.R.R.) Form 8
No. of Book 237 No. of Ticket 12 a

| West / East | Amt. | Paid | Date | | Month |
|---|---|---|---|---|---|
| Charlotte | | | | | |
| Rochester | $0.01 | $0.01 | 1 | 17 | Jan. |
| Spencerport | 0.02 | 0.02 | 2 | 18 | Feb. |
| Adams Basin | 0.03 | 0.03 | 3 | 19 | Mar. |
| Brockport | 0.04 | 0.04 | 4 | 20 | Apr. |
| Holley | 0.05 | 0.05 | 5 | 21 | May |
| Murray | 0.10 | 0.10 | 6 | 22 | June |
| Albion | 0.15 | 0.15 | 7 | 23 | July |
| Knowlesville | 0.20 | 0.20 | 8 | 24 | Aug. |
| Medina | 0.25 | 0.25 | 9 | 25 | Sept. |
| Middleport | 0.40 | 0.40 | 10 | 26 | Oct. |
| Gasport | 0.50 | 0.50 | 11 | 27 | Nov. |
| Lockport | 0.65 | 0.65 | 12 | 28 | Dec. |
| Lockp't Jun. | 0.75 | 0.75 | 13 | 29 | |
| Sanborn | 0.85 | 0.85 | 14 | 30 | |
| Susp. Bridge | 1.00 | 1.00 | 15 | 31 | |
| Niag. Falls | 1.25 | 1.25 | 16 | | |
| | 1.50 | 1.50 | | | |
| | 1.75 | 1.75 | | | |

New York Central & Hudson River Rail Road [illegible]

Form 8 a

Edward Wilhelm
John J. Bonner
Witnesses

Thos. A. Jebb Inventor
by Jay Hyatt Atty.

AM. PHOTO-LITHOGRAPHIC CO. N.Y. (OSBORNE'S PROCESS.)

UNITED STATES PATENT OFFICE

THOMAS A. JEBB, OF BUFFALO, NEW YORK.

IMPROVEMENT IN DUPLEX TICKETS.

Specification forming part of Letters Patent No. 137,081, dated March 25, 1873.

*To all whom it may concern:*

Be it known that I, THOMAS A. JEBB, of the city of Buffalo, in the county of Erie and State of New York, have invented an Improvement in Duplex Tickets, of which the following is a specification:

My improvement relates to a folded duplex or duplicate ticket, such as is described in Letters Patent No. 131,276, and others heretofore granted to me, to which reference is here made for a full description thereof.

These tickets are, as yet, mainly employed in the collection of passenger fares and charges for excess baggage on railroads, although they are adapted for a variety of other uses, as in the collection of fares on bridges, steamboats, &c.

When these tickets were first put in use by me on the railroads, the two halves or duplicate parts, as they are termed, which are designed one for the passenger and the other for the conductor, were of the same color, and differed only in respect to the printed matter occupying the central portion of each half ticket, which contained statements that distinguished one from the other, and indicated which part should be given to the passenger.

In using these tickets it was soon found that the conductors would take advantage of the ignorance and carelessness of a certain class of passengers, and especially of foreigners who were not familiar with the English language, to give to them the conductor's part of some ticket, the other half of which had been already given to another passenger, thereby enabling the conductor to collect two fares, and use and make returns of only one ticket, which rendered the ticket to a certain extent defective.

The object of my improvement is to prevent this fraudulent use of the conductor's portion of the ticket, and the consequent appropriation of fares by the conductor.

The invention for this purpose consists of a folded duplex ticket, in which the half designed for the passenger is so distinguished from the conductor's part by making the former or a part thereof of a different color from the conductor's ticket, or by equivalent means, as will enable other passengers and detectives at a distance from the passenger receiving the ticket, to readily distinguish whether the proper half of the ticket has been given him, whereby every person in a car becomes in fact a detective, some of whom would be certain to observe and expose any attempt on the part of the conductor to thus impose upon a passenger and defraud the company. This has been demonstrated by an actual use of my improved ticket, and has led to its rapid adoption by different railroad companies; arrangements having already been made or partially made for its use on upwards of thirty railroads in the State of New York alone.

To more certainly inform the passengers of the duty of the conductor and call their attention to any neglect on his part, plainly printed instructions are conspicuously posted in each car and in other places, in which instructions the duties of the conductor are particularly stated, among which is a direction of the following purport: "Having properly punched the ticket, separate and hand the colored half to the passenger, retaining the other for making the proper entry on report."

Not only is my improvement important as a check upon conductors, but it also prevents innocent mistakes on their part when collecting fares by the dim light of a lamp, and enables them to properly perform their duty with greater convenience and dispatch.

The accompanying drawing represents a face view of a duplex ticket with the two parts or leaves unfolded, the passenger half being distinguished by a colored band, which extends centrally and lengthwise of the ticket, as shown by the section lines at *a a*. The name of the railroad is also exhibited in this band on the ticket (not shown in the drawing) by a watermark or uncolored letters, which, in connection with the colored band, greatly increases the difficulty of counterfeiting the ticket.

It is obvious that the passenger half-ticket can be conspicuously distingushed by coloring the whole or portions of it in various ways and by other colored designs or figures than that of the band *a*, the essence of my invention being a duplex ticket in which there is such a marked difference in the appearance of the two parts as will enable them to be readily distinguished from each other by a dim light and at a considerable distance from the spectator, as the length of a car, and under circumstances which would render the difference in the printed matter on the two parts undistinguishable.

The ticket shown in the drawing represents a leaf taken from a book of tickets with the stub attached, and is printed with the name of the road, number of the book, the number of the ticket, date, columns of amounts paid, list of stations, &c.

It is obvious that my improvement is equally applicable to palace or sleeping car tickets, and to all duplex tickets when it is important to have one-half prominently distinguished from the other.

I claim as my invention—

A folded duplex ticket in which one part or half (as the passenger's) is conspicuously distinguished from the other by being of a different color, or by containing a prominent figure or design of a different color or appearance from that of the rest of the ticket or the other half thereof, substantially as hereinbefore set forth.

T. A. JEBB.

Witnesses:
JOHN J. BONNER,
EDWARD WILHELM.